Jan. 6, 1970  P. J. RUSH ET AL  3,487,687

FLUID VELOCITY LIMIT GAGE

Filed Nov. 30, 1967

INVENTORS
PAUL J. RUSH
ROBERT L. GEORGE

BY

ERVIN F. JOHNSTON
ATTORNEY

United States Patent Office 3,487,687
Patented Jan. 6, 1970

3,487,687
FLUID VELOCITY LIMIT GAGE
Paul J. Rush, Oxnard, Calif., and Robert L. George, Logan, Utah, assignors to the United States of America as represented by the Secretary of the Navy
Filed Nov. 30, 1967, Ser. No. 686,903
Int. Cl. G01f 1/00, 1/06
U.S. Cl. 73—194                              9 Claims

ABSTRACT OF THE DISCLOSURE

The disclosure describes a fluid velocity limit gage for determining whether a particular fluid velocity has been exceeded. The gage may include an aerodynamically shaped element which rests freely upon a support plate. Since a certain fluid velocity will be required to lift the shaped element from the plate a determination can be made that this velocity has been met or exceeded when the shaped element is so lifted. The support plate may be provided with a restraining means for preventing movement of the shaped element in the direction of the fluid velocity so that a positive lifting of the shaped element is required for indicating purposes. A plurality of shaped elements with varying lift actions may be mounted on a series of support plates so as to indicate the fluid velocity within a predetermined range.

The invention described herein may be manufactured and used by or for the Government of the United States of America for governmental purposes without the payment of any royalties thereon or therefor.

The present invention relates to a fluid velocity limit gage which is particularly suitable for indicating that a maximum wind velocity is located within a particular range of velocities.

It is important that maximum velocities of windstorms, such as hurricanes, in the various areas of the world be recorded and documented for future reference purposes. These maximum velocities, which are recorded by many weather bureaus, are particularly useful in setting the parameters for designs of fixed structures. The instruments which are presently in use for indicating maximum wind velocities are the anemometer and the venturi. The anemometer employs a series of fans or props which are shaft-connected to a recording instrument for indicating maximum wind velocity. The venturi measures wind pressure which can be converted by an appropriate table to determine wind velocity. Both of these types of wind gages are costly and require periodic maintenance. There has been an acute need for a wind gage which can be located at remote areas without the problem of periodic maintenance.

The present invention provides a very inexpensive limit wind gage which requires no maintenance. This gage includes an aerodynamically shaped element which is freely supported by any suitable means such as a support plate. The support plate is provided with a restraining means for preventing movement of the shaped element along the direction of the wind velocity so that the shaped element is lifted only when a particular wind velocity has been met or exceeded. When the shaped element is lifted from the support plate it is blown away, thereby providing the desired indication. The invention also contemplates the use of a plurality of such shaped elements which are freely mounted on a respective series of support plates. The shaped elements are provided with varying lift actions which correspond to predetermined respective varying wind velocities so that a wind velocity within a range limit can be ascertained by noting which shaped elements have been removed from their mountings. It should be understand that the present invention is not limited to determining wind velocities but can be used for determining velocity limits of any fluid.

An object of the present invention is to overcome the aforementioned disadvantages of prior art wind gages.

Another object is to provide an inexpensive fluid velocity limit gage which requires practically no maintenance.

A further object is to provide an inexpensive and practically care-free wind gage which indicates a maximum wind velocity within a particular range.

Other objects, advantages and novel features of the invention will become apparent from the following detailed description of the invention when considered in conjunction with the accompanying drawing wherein.

Figure 1:
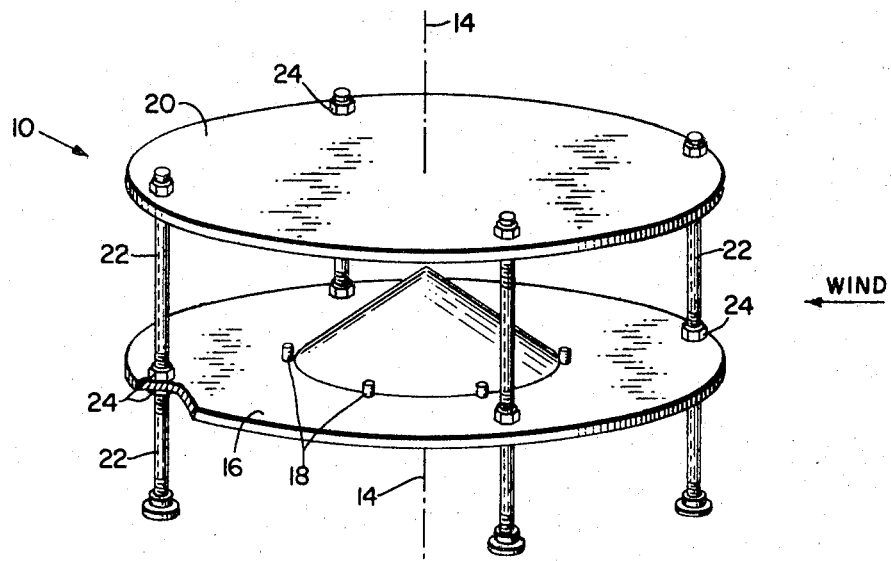
FIG. 1 is an isometric view of one embodiment of the invention.

Referring now to the drawing there is shown in FIG. 1 a wind velocity limit gage 10 which is capable of indicating whether a wind velocity has reached or exceeded a predetermined amount. The gage 10 includes an aerodynamically shaped element 12 which is substantially symmetrical about a central axis 14 so as to be capable of lift action along the central axis when there is air movement in any direction perpendicular to the central axis 14. As shown in FIG. 1, the element 12 may be aerodynamically shaped in the form of a cone, however, it is to be understood that other aerodynamic shapes would be suitable such as a dome.

The invention further includes a means for supporting the shaped element 12 for free movement along the central axis 14. This support means may include a flat plate 16. The flat plate 16 may be circular and the base of the conical shaped element 12 may rest directly thereon.

The support means may further include a means for restraining only perpendicular movement of the shape element 12 with respect to the central axis 14. This restraining means may comprise a plurality of small pins 18 which may be force fitted within the plate 16 in a spaced relationship about the periphery of the base of the shaped element 12. It is preferable that each of the pins 18 be located in close proximity to the base of the element 12 but that they not wedge the element 12 therebetween or imposed any material friction to the element 12 when it is lifted from the plate 16. Accordingly, the shaped element 12 will be substantially fully receptive to lift action caused by movement of air thereby. It is to be understood that restraining means, other than that described, can be employed. For instance, the conical shaped element 12 may be hollow in which case the plate 16 may be provided with a circular depression for receiving the bottom circular edge of the element 12 to prevent any movement perpendicular to the central axis 14.

Characteristically, windstorms, such as hurricanes, involve a great deal of turbulence and eddies which may introduce errors in wind velocity indications. In order to overcome this problem a second flat plate 20 may be connected directly above the first plate 16 in a spaced apart parallel relationship with the shaped element 12 located therebetween. This connection may be made by a series of threaded bars 22 which extend through both plates with top and bottom nuts 24 threaded on the bars 22 to maintain the desired spaced relationship between the plates 16 and 20. We have found a spacing between the plates 16 and 20 of a distance twice the height of the conical shaped element 12 to be quite satisfactory. With such a spacing and perpendicular extension of the plates 16 and 20 beyond the edge of the element 12, as shown in FIG. 1 wind turbulence and eddies within the vicinity of the element 12 are minimized. The rods 22 may extend downwardly from the plate 16 to a base, such as a rooftop, where they may be fixedly secured by any suitable means, such as concrete clumps (not shown).

A change in the aerodynamic shape or weight of the element 12 will cause a corresponding change in the lift action thereupon. Accordingly, the element 12 should be designed for a predetermined lift action. As an example, if the element 12 is designed for lifting when the wind velocity has reached or exceeded 80 m.p.h. the element 12 will be lifted from the plate 16 and blown therefrom when such a wind velocity has occurred. Accordingly, if the element 12 is missing from the gage 10 after a hurricane it will indicate to an observer that the wind velocity reached or exceeded 80 m.p.h. Since wind velocity parallel to the earth's surface is of primary concern, the gage 12 will be mounted with the central axis 14 substantially perpendicular to the earth's surface so that the wind direction is parallel to the plates 16 and 20.

Figure 2:
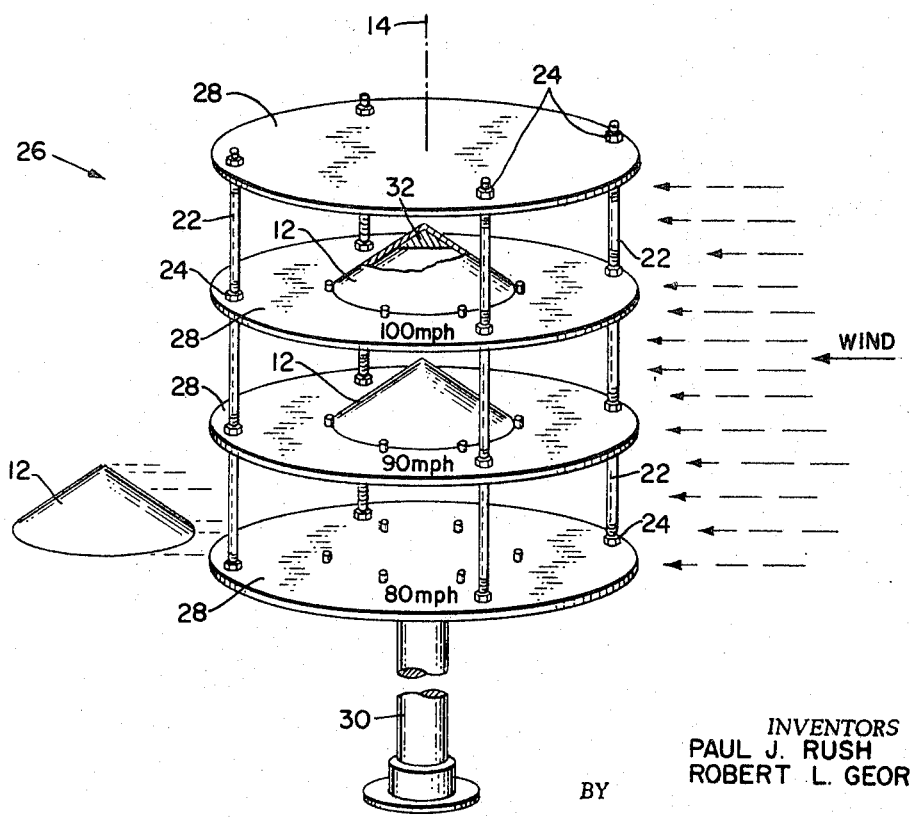
FIG. 2 is an isometric view with a portion cut away of still another embodiment of the invention.

Another embodiment of our invention is illustrated in FIG. 2. This wind gage 26 is capable of determining a maximum wind velocity within a predetermined range of wind velocities. The gage 26 is constructed similar to the previously described gage 10 with the exception that a plurality of shaped elements 12 and plates 28 are employed in an array fashion. In this manner the shaped elements 12 and the plates 28 are preferably located directly one above the other along the central axis 14. The spaced relationship of the plates 28 may be maintained by the rods 22 and the nuts 24 in a manner similar to that as described for the embodiment shown in FIG. 1. A post 30 may be centrally connected to the bottom of the bottom plate 28 by any suitable means, such as welding, and may extend downwardly thereto to a base where it may be securely fixed so as to position the central axis 14 generally perpendicular to the expected wind direction.

The shaped elements 12 of the gage 26 are provided with varying lift actions which correspond to predetermined respective varying wind velocities. This may be accomplished by utilizing elements 12 with the same aerodynamic configuration but with varying weights, or alternatively the aerodynamic configuration of each element may be appropriately varied. In the embodiment shown in FIG. 2 the elements 12 have the same aerodynamic configuration, however they are hollow so that they may be appropriately weighted within their interiors to provide the desired lift actions. The top element 12 has been partially cut away to show its internal structure with a weight 32 disposed therein. If the top element 12 is designed for lift action at a higher velocity than the other two elements 12 the weight 32 within the top element 12 will be heavier than either of the weights within the other elements. The shaped elements 12 may be constructed of sheet metal and the weights therein may be lead which may be constructed by pouring into the interior of the elements.

As an example of the operation of the gage 26 the elements 12 may be appropriately weighted so that the bottom element will undergo lift action when subjected to a wind velocity of 80 m.p.h., the middle element 12 designed for lift action at 90 m.p.h., and the top element 12 designed for lift action at 100 m.p.h. Assuming a wind velocity equal to or exceeding 80 m.p.h., but less than 90 m.p.h., only the bottom shaped element 12 will be lifted and blown from the gage so as to indicate that the velocity of the wind was within the range between 80 to 90 m.p.h. If the middle shaped element 12 had also been blown from the gage this would indicate that the wind velocity was between 90 to 100 m.p.h., and so forth. While the velocities are shown as over a ten mile per hour range differential, it is to be understood that the elements 12 can be designed for any desired range differential. A narrowing of the range would enable a more accurate determination of the maximum wind velocity.

It is to be understood that the present invention is not limited in its use for indicating wind velocities. The gage may also be employed for indicating velocities of any fluid such as water. For instance, in an ocean environment the element or elements 12 would undergo the same kind of lift action to indicate maximum ocean currents. The invention would also find considerable application for laboratory experiments involving fluid velocities.

Obviously many modifications and variations of the present invention are possible in the light of the above teachings. It is therefore to be understood that within the scope of the appended claims the invention may be practiced otherwise than as specifically described.

We claim:
1. A fluid velocity limit gage comprising:
   a flat support plate;
   a saucer-like aerodynamically shaped element which is substantially symmetrical about a central vertical axis so as to be capable of lift action along the central axis upon fluid movement in any direction perpendicular to said axis;
   said element resting directly on said support plate and the plate having means for supporting the element for free movement along the central axis; and
   the support means having means for restraining only perpendicular movement of the shaped element,
   whereby a certain fluid velocity limit can be ascertained upon lift action of the shaped element.
2. A fluid velocity limit gage as claimed in claim 1 wherein:
   the shaped element is a cone.
3. A fluid velocity limit gage as claimed in claim 1 wherein:
   the support means includes a flat plate.
4. A fluid velocity limit gage as claimed in claim 3 wherein:
   the shaped element is a cone.
5. A fluid velocity limit gage as claimed in claim 4 including:
   means adapted to be operatively connected to said flat plate for vertically positioning the central axis with the apex of the cone above its base.
6. A fluid velocity limit gage as claimed in claim 5 including:
   a second flat plate; and
   the first mentioned flat plate and the second flat plate being connected in a spaced apart parallel relationship with the cone located therebetween.
7. A fluid velocity limit gage as claimed in claim 6 wherein:
   the restraining means is a plurality of pins connected to the first mentioned flat plate about the base of said cone.
8. A fluid velocity limit gage comprising:
   a plurality of aerodynamically shaped elements, each of which is symetrical about a central axis so as to be capable of lift action along the central axis upon fluid movement in any direction perpendicular to said axis;
   means for supporting each of said shaped elements in a spaced relationship for free movement along said axis;

the support means having means for restraining only perpendicular movement of each shaped element; and the shaped elements being capable of varying lift actions which correspond to predetermined respective varying fluid velocities, whereby a fluid velocity range limit can be ascertained when out of a pair of shaped elements one element is lifted and the other is not lifted.

9. A fluid velocity limit gage as claimed in claim 8 wherein: the shaped elements are of different weights so as to provide the varying lift actions.

References Cited

UNITED STATES PATENTS 3,359,795  12/1967  Walsh _____ 73—189

FOREIGN PATENTS 432,416  7/1935  Great Britain.

JERRY W. MYRACLE, Primary Examiner

U.S. Cl. X.R.

73—228; 116—114